UNITED STATES PATENT OFFICE.

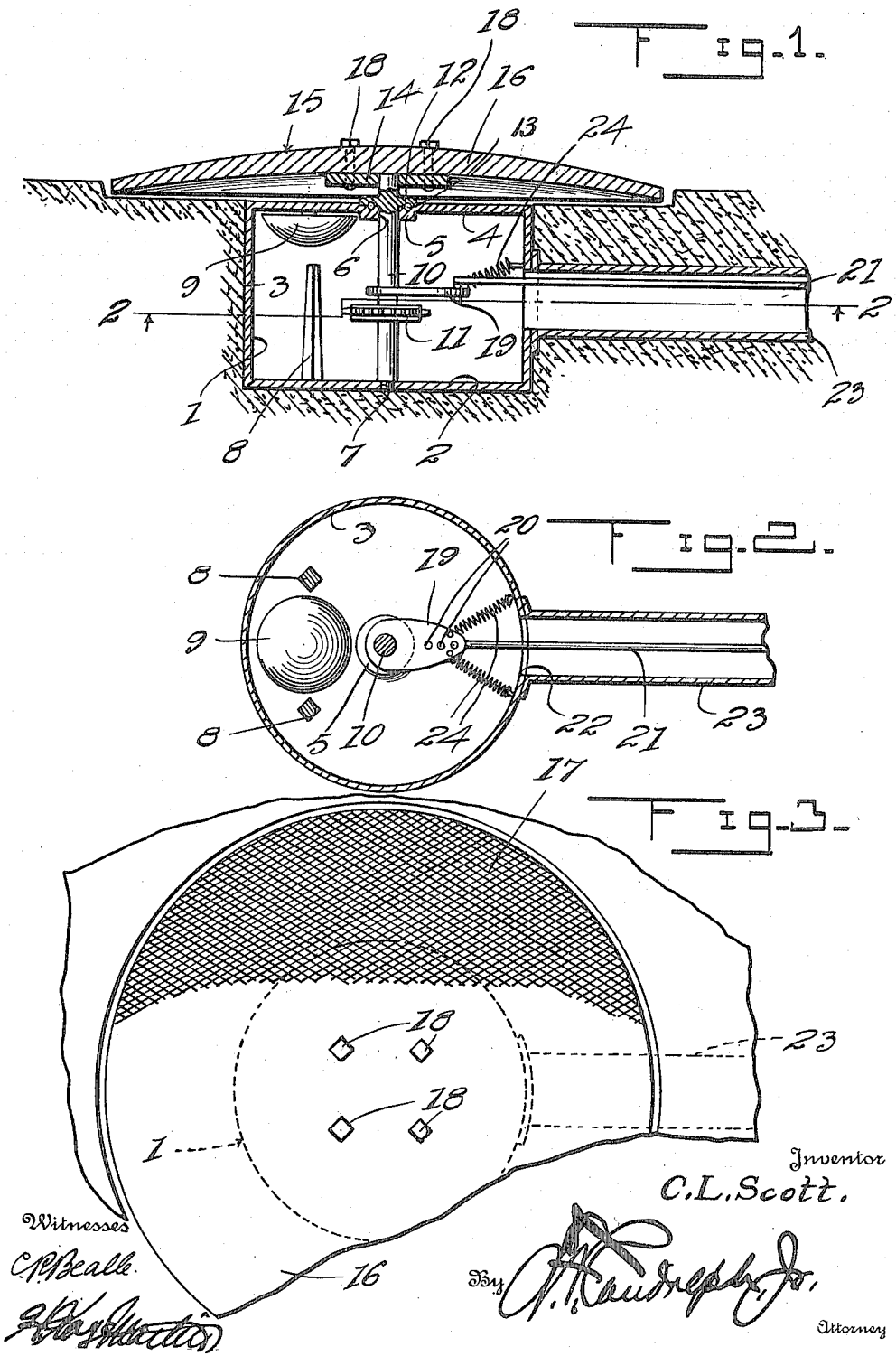

CHARLES L. SCOTT, OF SPRINGFIELD, OREGON.

TRANSMISSION OF POWER.

1,164,410.  Specification of Letters Patent.  Patented Dec. 14, 1915.

Application filed March 17, 1915. Serial No. 15,016.

*To all whom it may concern:*

Be it known that I, CHARLES L. SCOTT, a citizen of the United States, residing at Springfield, in the county of Lane and State of Oregon, have invented certain new and useful Improvements in the Transmission of Power; and I do hereby declare the following to be a full, clear, and exact description of the invention, such as will enable others skilled in the art to which it appertains to make and use the same.

This invention relates to new and useful improvements in the transmission of power, and has for its principal object to provide a device which is particularly adapted for use in opening or closing doors for operating electric switches and also provide driving means for different kinds of machinery.

Another object of this invention is to provide a power transmitting device which is designed to use the power from the drive wheels of a motor vehicle or similar device for the purpose of opening or closing garage doors, throwing electric switches, and also for the driving of other machinery.

A further object of the invention is to provide a device which may be used in connection with a motor vehicle without removing the tires or in any other way altering the vehicle.

Still another object of the invention is to provide a device which may be embedded in the ground so that the vehicle may be driven thereover and in such a way that the rear wheels of said vehicle will operate the device.

With these and other objects in view, the invention consists in the novel combination and arrangement of parts which will be fully set forth in the following specification and accompanying drawings, in which, Figure 1 is a sectional view of this improved power transmitting device showing the same in position for operation, Fig. 2 is a horizontal sectional view taken on line 2—2 of Fig. 1, and Fig. 3 is a fragmentary top plan view of the device.

Referring now to the drawings by characters of reference, the numeral 1 designates the casing for the mechanism, which comprises the bottom 2 which is provided with the upstanding walls 3 at both of its sides and ends. A suitable top 4 is provided and has formed centrally thereof the inwardly extending boss 5, which is provided with a central aperture 6 having at its upper end a ball race. A suitable central aperture 7 is formed in the bottom wall 2, and the apertures 6 and 7 coöperate in forming bearings for the drive shaft of the device which will be more fully hereinafter described. Extending upwardly from the bottom wall 2 are a pair of spaced stops 8 which are designed to limit the rotation of the shaft of the device when the same is in use. A suitable bell 9 is secured to the top wall intermediate the stops 8 and is arranged to give an audible signal when a door, in connection with which the device is used, has reached its limit of swing or the proper stroke is given to the rod.

Journaled in the bearings 6 and 7 is the shaft 10 hereinbefore referred to, which is provided intermediate its ends with a suitable sprocket 11 and is formed near its upper end with the flange 12 which is formed with a ball race for the reception of the bearing balls 13 which run in the ball race in the boss 5 hereinbefore referred to. The lower end of the shaft 10 is formed with a suitable reduced cylindrical extension which is journaled in the opening 7 in the wall 2 and it will be evident that the shaft is thereby held rigidly in the center of the device. Threaded on the upper end of the shaft 10 is a suitable disk 14 which forms a support for the power transmitting plate which will be more fully hereinafter described.

The power transmitting plate hereinbefore referred to, is designated generally by the numeral 15 and comprises the concavo-convex disk 16, the upper surface of which is roughened as at 17. This concavo-convex disk is provided with suitable apertures for the reception of the bolts 18 which extend therethrough and into the disk 14 to hold the plate 15 into operative position.

As shown in the drawings, the lever 19 is secured intermediate the ends of the shaft 10 and is provided with a plurality of openings 20 for the reception of the upturned end of the connecting rod 21 which is connected at its opposite end to the door-operating mechanism. This connecting rod 21 extends through an aperture 22 formed in the wall 3 and is operable through the conduit 23 its opposite end to the door-operating mechanism. In order to return the device to its normal position, the springs 24 are provided and are connected to the lever 19 and to the wall 3 of the casing 1.

It will be apparent from the foregoing that in use assuming the device to be connected in such a way as to control the movement of a door for a garage or shed, the vehicle is driven so that one of the rear wheels will pass over the upper surface of the plate 15 to one side of the center of the plate 15 and by the rotation of the vehicle wheel, it will be evident that the frictional contact of the tire with the roughened surface 17 of the plate 15 will cause said plate to revolve and thereby cause the shaft 10 to rotate in its bearings 6 and 7. This movement will actuate the lever 19 and thereby operate the door mechanism through the means of the connecting link 21. Should it be so desired, the lever 19 may be eliminated as well as the connecting link 21 and the device may be connected to the door-operating means by passing a suitable chain around the sprocket 11. After the door has been moved to the proper position the lever engages the stops 8 and in this way prevents the device from passing beyond a predetermined point. Simultaneously with the stoppage of the lever against one of the stop members 8, the bell 9 is rung, thus audibly signaling the user that the limit of movement has been reached. When the device is used to transmit power for operating machinery, the stops are removed, and the device connected up by means of the chain passing over the sprocket 11 so that the rear wheel of the vehicle may be driven upon the plate 15 and set in motion, thereby causing the plate to revolve and transmitting power to the other machinery to be operated.

While in the foregoing there has been shown and described the preferred embodiment of this invention, it is to be understood that such changes may be made in the combination and arrangement of parts as will fall within the spirit and scope of the invention as claimed.

What is claimed is:

1. A device of the character described including a housing, a vertical shaft journaled in the housing, a horizontal plate connected to the shaft and located on the exterior of the housing, and means on the shaft interiorly of the housing to transmit power when the shaft is rotated.

2. A device of the character described including a housing, a shaft journaled in the housing, a plate at the upper end of the shaft and on the exterior of the housing, means carried by the shaft within the housing to transmit power, and means to limit the rotation of the shaft.

3. A device of the character described including a housing, a shaft journaled in the housing, a plate carried at the upper end of the shaft, said plate being provided with a roughened upper surface, and means carried by the shaft on the interior of the housing to transmit power.

4. A device of the character described including a housing, a shaft journaled in the housing, a concavo-convex plate carried at the upper end of the shaft and being provided with a roughened surface on its upper face, means on the interior of the housing to transmit power, and means on the interior of the housing to limit the movement of the shaft.

5. A device of the character described including a housing, a shaft journaled centrally of the housing, a concavo-convex plate at the upper end of the shaft and on the exterior of the housing, means to transmit power carried by the shaft within the housing, and means to return the shaft to its normal position when the same is rotated.

In testimony whereof I affix my signature in presence of two witnesses.

CHARLES L. SCOTT.

Witnesses:
F. DAVIS,
FLORENCE E. COFFIN.